(12) United States Patent
Chang et al.

(10) Patent No.: US 11,068,772 B2
(45) Date of Patent: Jul. 20, 2021

(54) SYSTEMS AND METHODS FOR AUTOMATIC APPAREL WEARABILITY MODEL TRAINING AND PREDICTION

(71) Applicant: CaaStle, Inc., New York, NY (US)

(72) Inventors: Li-Wei Chang, Millbrae, CA (US); Dongming Jiang, Los Angeles, CA (US); Georgiy Goldenberg, Los Altos, CA (US); Krishnan Vishwanath, San Jose, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/275,989

(22) Filed: Feb. 14, 2019

(65) Prior Publication Data

US 2020/0265292 A1   Aug. 20, 2020

(51) Int. Cl.
*G06N 3/04* (2006.01)
*G06N 3/08* (2006.01)
*G06Q 30/02* (2012.01)

(52) U.S. Cl.
CPC ............ *G06N 3/0427* (2013.01); *G06N 3/08* (2013.01); *G06Q 30/0202* (2013.01)

(58) Field of Classification Search
CPC ..... G06N 3/0427; G06N 3/08; G06Q 30/0202
See application file for complete search history.

(56) References Cited

U.S. PATENT DOCUMENTS

| | | | |
|---|---|---|---|
| 8,103,551 B2 * | 1/2012 | Saul | G06Q 30/02 705/26.1 |
| 2014/0244431 A1 | 8/2014 | Bright et al. | |
| 2016/0140641 A1 | 5/2016 | Baca et al. | |
| 2016/0171365 A1 * | 6/2016 | Stepanovskiy | G06N 3/0436 706/9 |
| 2017/0076011 A1 * | 3/2017 | Gannon | G06Q 30/0633 |
| 2017/0287044 A1 | 10/2017 | Rose et al. | |
| 2018/0218436 A1 | 8/2018 | Cooper | |
| 2018/0308149 A1 * | 10/2018 | Guo | G06Q 30/0631 |

(Continued)

OTHER PUBLICATIONS

International Preliminary Report on Patentability and Written Opinion issued in International Application No. PCT/US20/17895, dated May 11, 2020 (11 pages).

*Primary Examiner* — Kamran Afshar
*Assistant Examiner* — Urmana Islam
(74) *Attorney, Agent, or Firm* — Bookoff McAndrews, PLLC

(57) ABSTRACT

Disclosed are methods, systems, and non-transitory computer-readable medium for executing neural network training for dynamically predicting apparel wearability. For example, a method may include generating a training data set comprising one or more historical data attributes of previously shipped apparel, training a neural network based on the training data set to configure one or more trained models to output a metric for any pair of a unique user identifier and a unique apparel identifier, storing one or more trained model objects, collecting prediction data comprising at least one prediction pair including a unique user identifier and a unique apparel identifier, predicting one or more predictive wearability metrics indicative of propensity to wear, dynamically generating one or more match pairs, and determining a match wearability metric for each of the one or more match pairs based on the predicted one or more predictive wearability metrics.

15 Claims, 7 Drawing Sheets

(56) References Cited

U.S. PATENT DOCUMENTS

2018/0365695 A1* 12/2018 Liu .................... G06K 9/00885
2019/0073335 A1*  3/2019 Foley .................... G06N 20/00
2019/0108458 A1*  4/2019 Yu ......................... G06N 20/00
2019/0205965 A1*  7/2019 Li ...................... G06Q 30/0631

* cited by examiner

SYSTEMS AND METHODS FOR AUTOMATIC APPAREL WEARABILITY MODEL TRAINING AND PREDICTION

TECHNICAL FIELD

Various embodiments of the present disclosure generally relate to dynamically predicting apparel wearability using machine learning and predictive modeling, and more particularly, to executing uniquely trained neural network model objects to dynamically predict apparel wearability using real-time transaction data.

BACKGROUND

For subscription-based services, a key driver for retaining subscribers and enhancing user activities is ensuring that the subscribed services are actually being used to a desired extent. For example, a subscriber of a service is not likely to consider subscription costs to be worthwhile if it becomes apparent to the subscriber that he or she has not been actually using the service to a sufficient extent. Alternatively, a subscriber may remain loyal to the service provider, or become even more actively involved in the subscription activities, if the subscriber is satisfied with the amount of actual use. Thus, it may be highly desirable for subscription-based service providers to make recommendations that increase the likelihood of actual use of the service by its subscribers, and to achieve such an increase of likelihood for as many users as possible despite their differences in individual tastes or preferences.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed to execute neural network training for dynamically predicting apparel wearability.

In one embodiment, a computer-implemented method is disclosed for executing neural network training for dynamically predicting apparel wearability. The computer-implemented method may comprise: generating, by one or more processors, a training data set comprising one or more historical data attributes of previously shipped apparel, each of the historical data attributes being linked to a unique user identifier and a unique apparel identifier; training, by the one or more processors, a neural network based on the training data set to configure one or more trained models to output a metric for any pair of a unique user identifier and a unique apparel identifier; storing, by the one or more processors, the one or more trained models as one or more trained model objects; collecting, by the one or more processors, prediction data comprising at least one prediction pair including a unique user identifier and a unique apparel identifier, each prediction pair corresponding to a closeted apparel, a purchased apparel, or a returned apparel; predicting, by the one or more processors, one or more predictive wearability metrics indicative of propensity to wear, by executing the stored one or more trained model objects with the prediction data, wherein the one or more predictive wearability metrics are one or more metrics output by the executed one or more trained model objects; dynamically generating, by the one or more processors, one or more match pairs, each match pair including a unique user identifier and a unique apparel identifier; and determining, by the one or more processors, a match wearability metric for each of the one or more match pairs based on the predicted one or more predictive wearability metrics.

In accordance with another embodiment, a computer system is disclosed for executing neural network training for dynamically predicting apparel wearability. The computer system may comprise: a memory having processor-readable instructions stored therein; and at least one processor configured to access the memory and execute the processor-readable instructions, which when executed by the processor configures the processor to perform a plurality of functions, including functions for: generating a training data set comprising one or more historical data attributes of previously shipped apparel, each of the historical data attributes being linked to a unique user identifier and a unique apparel identifier; training a neural network based on the training data set to configure one or more trained models to output a metric for any pair of a unique user identifier and a unique apparel identifier; storing the one or more trained models as one or more trained model objects; collecting prediction data comprising at least one prediction pair including a unique user identifier and a unique apparel identifier, each prediction pair corresponding to a closeted apparel, a purchased apparel, or a returned apparel; predicting one or more predictive wearability metrics indicative of propensity to wear, by executing the stored one or more trained model objects with the prediction data, wherein the one or more predictive wearability metrics are one or more metrics output by the executed one or more trained model objects; dynamically generating one or more match pairs, each match pair including a unique user identifier and a unique apparel identifier; and determining a match wearability metric for each of the one or more match pairs based on the predicted one or more predictive wearability metrics.

In accordance with another embodiment, a non-transitory computer-readable medium containing instructions is disclosed for executing neural network training for dynamically predicting apparel wearability. The non-transitory computer-readable medium may comprise instructions for: generating a training data set comprising one or more historical data attributes of previously shipped apparel, each of the historical data attributes being linked to a unique user identifier and a unique apparel identifier; training a neural network based on the training data set to configure one or more trained models to output a metric for any pair of a unique user identifier and a unique apparel identifier; storing the one or more trained models as one or more trained model objects; collecting prediction data comprising at least one prediction pair including a unique user identifier and a unique apparel identifier, each prediction pair corresponding to a closeted apparel, a purchased apparel, or a returned apparel; predicting one or more predictive wearability metrics indicative of propensity to wear, by executing the stored one or more trained model objects with the prediction data, wherein the one or more predictive wearability metrics are one or more metrics output by the executed one or more trained model objects; dynamically generating one or more match pairs, each match pair including a unique user identifier and a unique apparel identifier; and determining a match wearability metric for each of the one or more match pairs based on the predicted one or more predictive wearability metrics.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
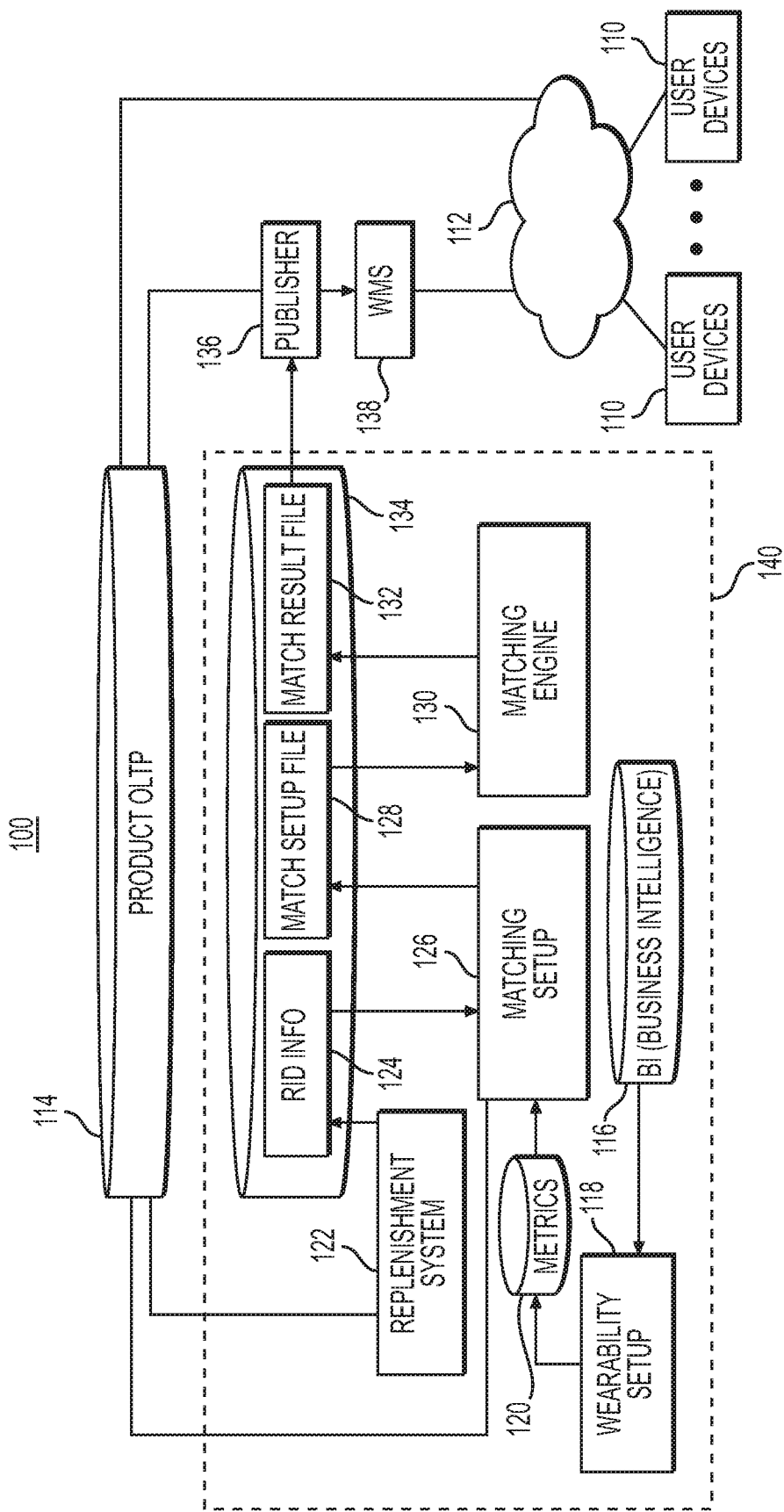
FIG. 1 depicts an example environment in which methods, systems, and other aspects of the present disclosure may be implemented.

The following embodiments describe systems and methods for executing neural network training in order to dynamically predict apparel wearability. As noted above, there exists a need for service providers (e.g., subscription-based service providers) to increase the likelihood of actual use of the service by its users, and to achieve such an increase of likelihood for as many users as possible despite their differences in individual tastes or preferences. A service platform with such an objective may include, for example an electronic platform that enable users to subscribe to, purchase, or rent apparel, operating under key considerations such as, for example, determining whether each subscriber actually wears the rented apparel in a particular rental cycle. The value of the service may improve greatly if the provider intelligently allocates or recommends apparel with higher probabilities of being worn by the user.

While the exemplary system architecture as described in the present disclosure relates to an electronic transactions for subscribing to, purchasing, or renting apparel (e.g., clothing-as-a-service (CaaS) or Try-Then-Buy (TTB) service), implementations disclosed herein may effectively serve any other subscription, product purchase, or online transaction service such as, for example, subscribing to or making purchases in a software service, cleaning service, delivery service, maintenance service, rental product, rental vehicles, etc., without departing from the scope of the disclosure. For example, the characteristic of being wearable or having a measure of high wearability (e.g., having propensity to wear apparel) may correspond to a characteristic of being usable in contexts outside of apparel (e.g., having propensity to use a subscribed rental product or service).

In accordance with the present disclosure, allocating or recommending apparel and/or a virtual closet of apparel with a higher percentage of being worn by the subscriber may be achieved by uniquely configured machine learning and predictive modeling. Given the vast amount of data attributes that may be collected from historical transactions, data sets indicative of each user's relationship with certain apparel (e.g., a binary flag of whether a shipped garment was actually worn by a user) may be formed and/or retrieved. Additionally, a computing system may transform such data sets to a training data set, and run neural network model training using the training data set. Within this process, specifically customized training of neural networks, combined with their practical application of constantly predicting wearability metrics and providing a user with highly wearable apparel, produces unconventional and unique automations which necessarily achieve technological improvements through the particular automation processes described more in detail below. Consequently, the unconventional and unique aspects of these automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used in the present disclosure, the term "CaaS" (i.e., clothing-as-a-service) may collectively refer to computer-implemented services and functions associated with subscription, purchase, and/or rental services for users (e.g., periodic subscription for receiving apparel, apparel rental or purchase order, distribution, return processing, TTB services, account management, marketing, customer service, warehouse operations, etc.). As used in the present disclosure, the term "apparel" may refer to any article of clothing, apparel, jewelry, hat, accessories, or other product which may be worn by a user.

As used in the present disclosure, the term "wearability" may refer to a propensity or a probability of a user actually wearing a given garment, and the term "wearability metric" may be a metric indicating a level of wearability. As used in the present disclosure, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more matching garments and/or determining wearability metrics for given garments, and "allocating" may refer to a computer-implemented operation of determining the garments that should be assigned and shipped to one or more particular users.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more user devices 110, a network 112, product online transaction processing (product OLTP) component 114, a publisher 136, warehouse management system (WMS) 138, and wearability modeling and matching system 140.

Users of the example environment 100 may use one or more user devices 110 (e.g., a computing device, a mobile device, or the like) to access and/or apply the results generated from the wearability modeling and matching system 140. The one or more user devices may be in communication with the product OLTP component 114, the WMS 138, and/or other user devices among the user devices 110, using a network 112. Further, the user devices 110 may allow a user to display a web browser, an application, or any other user interface for accessing information generated by product OLTP component 114, warehouse management system 138, and/or other user devices among the user devices 110. For example, a device among the one or more of the user devices 110 may load an application with graphical user interface (GUI), and the application may display on the GUI one or more apparel recommendations for closeting by the user.

The wearability modeling and matching system 140 may provide users with various features necessarily providing technical improvements over platforms which merely provide users with selection choices without wearability analysis functions. In some implementations, the wearability modeling and matching system 140, along with product OLTP component 114 and/or WMS 138, may provide a user with computer-implemented user-facing recommendations of apparel. These computer-implemented recommendations, for example, may uniquely take into account (i) which apparel(s) the particular user is likely to wear, (ii) apparel(s) similar to other apparel(s) which the particular user is likely to wear, (iii) apparel(s) with high wearability to other users who are similar to the particular user, and/or (iv) apparel(s) with high wearability to other users who have had similar experiences with the particular user. In making such recommendations to the user interface, the wearability modeling and matching system 140, along with product OLTP component 114 and/or WMS 138, may use wearability metrics (e.g., predictive wearability metrics and/or match wearability metrics as described in detail below) as key considerations. For example, the user interface at the user devices may display apparel that ranks above a preset threshold number, in a ranked list of predictive wearability metrics and/or match wearability metrics.

Additionally, or alternatively, the wearability modeling and matching system 140, along with product OLTP component 114 and/or WMS 138, may use wearability metrics (e.g., predictive wearability metrics and/or match wearability metrics as described in detail below) as key considerations for one or more closet curation features. For example, the environment 100 may assist user devices 110 (e.g., by providing recommendations for notifications) at purging or replacing apparel with low wearability based on one or more reasons such as size, seasonality, styles, fabric, and/or other advanced attributes. In these implementations, the wearability modeling and matching system 140, along with product OLTP component 114 and/or WMS 138, may select apparel with low wearability metrics (e.g., predictive wearability metrics and/or match wearability metrics as described in detail below) below a preset threshold value.

The product OLTP component 114 may be one or more computer-implemented data processing and storage systems configured to process online transactions from user devices 110. The product OLTP component 114 may process, for example, order entries, sales transactions, return processing, replenishment support/processing, and financial transactions. Further, the product OLTP component 114 may be in communication with at least the replenishment system 122, the publisher 136, and matching setup engine 126 with message bus or channels to exchange data with other connected systems. The publisher 136 may, for example, receive information from the product OLTP component 114 and communicate the received information to the WMS 138. The product OLTP component 114 may include, or be connected to, one or more databases with tables or any other data structures included therein. The one or more databases included in or connected to the product OLTP component 114 may be configured to receive and respond to queries for data associated with transactions. Additionally, or alternatively, the one or more databases in the product OLTP component 114 may be configured to transmit data at regularly scheduled intervals, transmit data via an asynchronous scheduling, and/or respond to authorized requests associated with reading, writing, and/or retrieving the data stored therein.

The wearability modeling and matching system 140 may provide an architecture for a plurality of sub-processes associated with predictive modeling and wearability matching/allocations, including generating analytics, wearability training, wearability prediction, and wearability matching. As supporting architecture for the sub-processes, the wearability modeling and matching system 140 may comprise various components, such as a BI (business intelligence) component 116, a wearability setup subsystem 118, a metrics database 120, a replenishment system 122, a match database 134, RID information repository 124, a matching setup engine 126, a match setup file repository 128, a matching engine 130, and a match result file repository 132.

The BI component 116 may store and/or provide historical information stored in a data warehouse, as well as new data gathered from other source systems as they are generated, such as, for example, both historical analytics and real-time predictions. For example, the data stored and output by BI component 116 may comprise raw attributes from a data warehouse, historical shipping and RN (return notification) data, and historical closet data, as well as dynamic data feed from active closet, as described in more detail below with respect to FIG. 2. BI component 116 may serve as the sole source of data feed for wearability setup subsystem 118. Additionally, or alternatively, the wearability setup subsystem 118 may be in communication with, and receive data, from product OLTP component 114.

The wearability setup subsystem 118 may be in communication with BI component 116 and/or the product OLTP component 114, and may comprise a plurality of modules which perform wearability data preparation, wearability training, and wearability prediction. The individual modules which may perform these functions are described in detail below with respect to FIG. 2. The wearability setup subsystem 118 may receive input data from BI component 116, which may comprise, for example, raw attributes, historical shipping and return notification data, historical closet data, and active closet data. The receiving or streaming or input data from BI component 116 may run periodically, asynchronously, or via push and/or pull operations.

The wearability setup subsystem 118 may be in communication with a metrics database 120. The metrics database 120 may be comprise data management components and/or databases such as, for example, Elasticsearch, Hbase, or any other data search/storage components capable of indexing, retrieving, and/or searching documents, or functioning as key-value-pair stores. The wearability setup subsystem 118 may transmit output data to the metrics database 120. The output data may be, for example, one or more predictive wearability metrics indicative of propensity to wear one or more garments. Such one or more predictive wearability metrics may, for example, each correspond to a prediction pair including a unique user identifier (e.g., UUID) and a unique apparel identifier (e.g., a stock keeping unit or "SKU"). The specific functions by which the wearability setup subsystem 118 produces the output data based on the input data is described in further detail with respect to FIG. 2 below.

The replenishment system 122 may be in communication with the product OLTP component 114, and may receive input data from the product OLTP component 114 periodically, asynchronously, or via push and/or pull operations (e.g., dynamic feed into the replenishment system 122). The input data may be, for example, return notification (RN) attributes of a user's RN, as well as any other data attributes associated with RN attributes. Based on the input data, the replenishment system 122 may generate replenishment identifiers (RIDs) for a user, along with any other data attributes associated with each RID. An RID may be, for example, an identifier generated by the replenishment system 122 in response to a user's RN and/or a detection that a user has an open slot and is eligible for next box and shipping. Additionally, or alternatively, the wearability setup subsystem 118 may generate RIDs in a modeling data processing module 216, as described in further detail with respect to FIG. 2 below. The replenishment system 122 may transmit RIDs, along with any other data attributes associated with each RID, to a match database 134.

The match database 134 may be in communication with the replenishment system 122. The match database 134 may comprise one or more subcomponents such as, for example, RID information repository 124, a match setup file repository 128, and a match result file repository 132. The match database 134 may receive the RIDs (e.g., along with any other data attributes associated with each RID) and store the received data to RID information repository 124.

The matching setup engine 126 may be in communication with the metrics database 120, the match database 134, the RID information repository 124, match result file repository 132, and the product OLTP component 114. The matching setup engine 126 may be run in cycles, such as in periodic cycles (e.g., every hour), asynchronously, or via push and/or pull operations based on events such as generation of an RID. At each cycle, the matching setup engine 126 may receive one or more RIDs dynamically generated at the RID information repository 124. Additionally, or alternatively, the matching setup engine 126 may receive generated RIDs from the metrics database 120. For the received RIDs, the matching setup engine 126 may retrieve all data attributes or metadata related to those RIDs, such as unique user identifiers (e.g., UUIDs), unique apparel identifiers (e.g., SKU information), and/or any other data attributes associated with the unique user identifiers and/or apparel identifiers, from product OLTP component 114. In some implementations, the matching setup engine 126 may also receive data attributes associated with active closets or closeted apparel, from the product OLTP component 114, in order to generate match pairs based on active closet data.

The matching setup engine 238 may then dynamically generate match pairs, each match pair including a unique user identifier (e.g., UUID) and a unique apparel identifier (e.g., SKU) retrieved from the product OLTP component 114. The matching setup engine 238 may then retrieve a corresponding match wearability metric from the metrics database 120, from the predictive wearability metrics stored at the metrics database 120. For example, for each match pair, the matching setup engine 126 may make an online request to the metrics database 120, to retrieve the predictive wearability metric which correspond to the match pair (e.g., UUID-SKU), and store it as the match wearability metric for the match pair, at the match setup file repository 128 in the match database 134.

In some implementations, the matching setup engine 238 may perform its functions in separate and independent cycles from the functions performed by wearability setup subsystem 118. For example, the wearability setup subsystem 118 may perform its functions of preparing and building wearability model, processing prediction data, and generating predictive wearability metrics offline (e.g., as back-end operation cycles which may be performed at different and independent schedules in comparison to the operation cycles performed by the matching setup engine 238) and store the output data in the metrics for ad hoc online retrievals by the matching setup engine 238. Such an implementation may achieve reduced online execution times of producing wearability metrics, in comparison to implementation in which wearability setup subsystem 118 and matching setup engine 238 perform operations together at each online request or each cycle iteration. The implementation of offline computations by wearability setup subsystem 118 (e.g., computations performed independently from online activities of the matching setup engine 238) may result in latency of data required at the matching setup engine 238, such as missing match pairs. To remedy such latency, if there exists a missing predictive wearability metrics for match pairs at matching setup engine 238, the matching setup engine 238 may generate an alert and/or fill the missing data with a default value (e.g., a neutral value such as 50%, or any other preset default value).

Alternatively, the wearability setup subsystem 118 and the matching setup engine 238 perform operations together in each cycle iteration, such that predictive wearability metrics are generated online for immediate use by the matching setup engine 126 (e.g., without any latency caused by independently performed storage operations, or without a need for the metrics database 120). Such implementation of online metrics computation may eliminate latency of data between the wearability setup subsystem 118 and the matching setup engine 238, and also enable the online retrieval services to be used by other subsystems (e.g., subsystems within the environment 100, and/or subsystems in communication with the environment 100). This implementation may result in higher online execution times of producing wearability metrics, in comparison to the offline computation implementation described above.

The matching engine 130 is in communication with the match setup file repository 128 and the match result file repository 132. The matching engine 130 may run in cycles, such as in periodic cycles (e.g., every hour), asynchronously, or via push and/or pull operations. The matching engine 130 may run in the same, synchronous cycles as the matching setup engine 126. At every cycle, the matching engine 130 may receive input data from the match setup file repository 128, such as the stored match wearability metrics for one or more match pairs. Based on the received data, the matching engine may generate, for example, two result files for each match pair. A first result file may have the wearability metrics associated with the match pair, such as, for example, expected wearability probability, average wearability rate, priority success rate, missing keys at match-setup time, and number of matches-in-picking without computed metrics. A second result file may have cost-function results for the matching optimization which may be calculated by, for example, first calculating an adjusted score as adjusted score=I(is_prioritized)*x*match wearability metric, and then calculating the cost for matching allocation as x-adjusted score. The result files may be then stored at the match result file repository 132.

The match result file repository 132 may be in communication with the matching engine 130 and the publisher 136. The publisher 136 may be in communication with WMS 138. Both the publisher 136 and WMS 138 may be in communication with the user devices 110 via the network 112. The publisher 136 may retrieve data attributes from the result files stored in the match result file repository 132, and output data from the result file (e.g., wearability metrics, average wearability rate, priority success rate, missing keys at match-setup time, and number of matches-in-picking without computed metrics) in a specifically preset or default publishing format. The output of the publisher 136, for example, may be retrieved directly by the user devices 110, or by the WMS 138. The WMS 138 may be connected to the user devices 110 via the network 112. The WMS 138 may perform functions of, for example, storing and/or transmit warehouse management data attributes derived or generated based on the output of the publisher 136.

The number and arrangement of devices, networks, and components shown in FIG. 1 are provided as an example. In practice, there may be additional devices and/or components, fewer devices and/or components, different devices and/or components, or differently arranged devices and/or components than those shown in FIG. 1. Furthermore, two or more devices or components shown in FIG. 1 may be implemented within a single device, or a single device shown in FIG. 1 may be implemented as multiple, distributed devices. Additionally, or alternatively, a device or component of environment 100 may perform one or more functions described as being performed by another device or component of environment 100.

Figure 2:
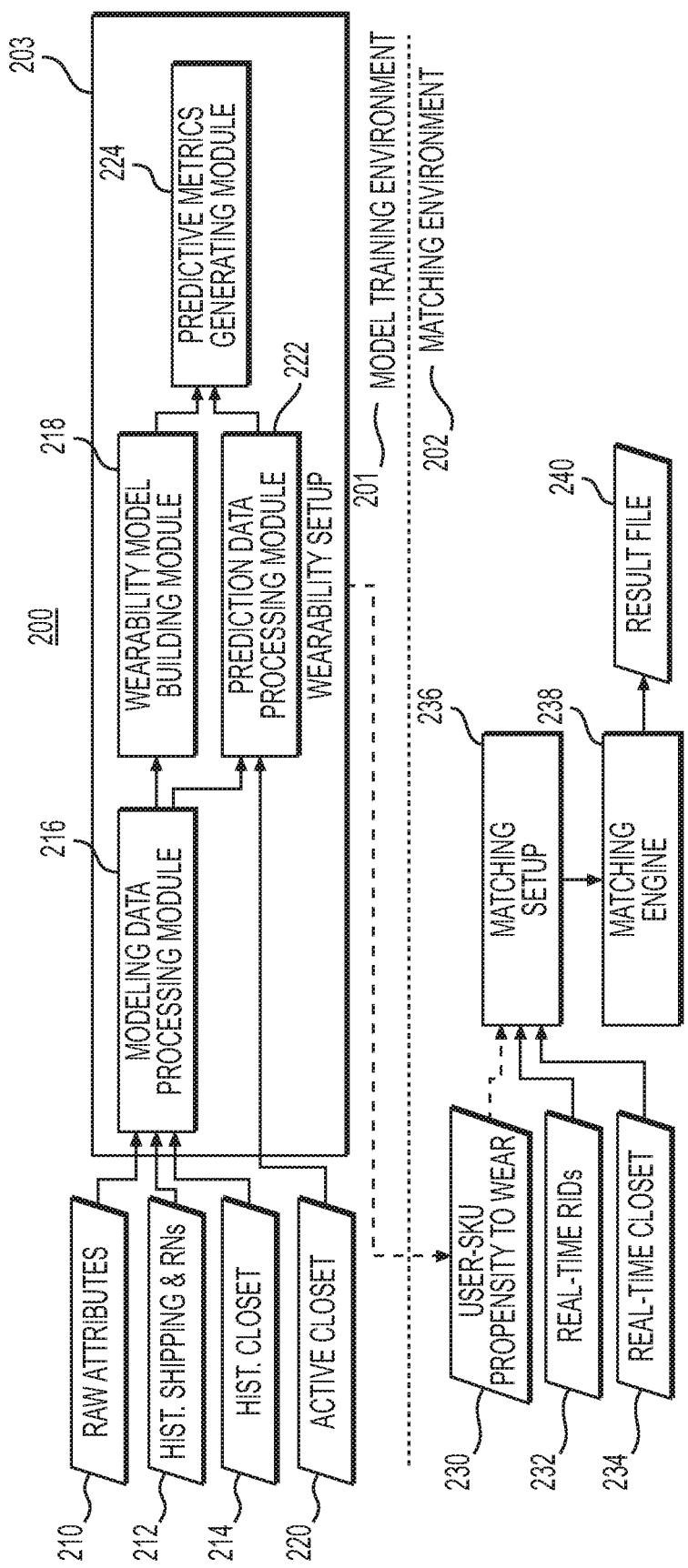
FIG. 2 depicts a block diagram schematically showing a system architecture and data flow in an exemplary implementation of the wearability setup subsystem, according to one or more embodiments.

FIG. 2 depicts a block diagram schematically showing a system architecture and data flow in an exemplary environment 200 of the wearability setup subsystem, according to one or more embodiments. The exemplary environment 200 may have two processes which run respectively in two computing environments, such as a model training environment 201 and a matching environment 202. The model training environment 201 may be implemented using, for example, SQL and/or Python. The matching environment 202 may be implemented using, for example, Java or any other programming language capable of conditional matching algorithms. As described above with respect to FIG. 1, the model training environment 201 may host an offline process of predictive wearability metrics computations, which may not need to run in real-time to any operation of the matching environment 202, or be executed online together with any online process of the matching environment 202. Alternatively, the model training environment 201 and the matching environment 202 may both run online (e.g., both running a cycle in each online process), such that predictive wearability metrics are generated online for immediate use without any data latency.

The model training environment 201 may comprise a wearability setup subsystem 203, which may execute a plurality of different modules (e.g., a modeling data processing module 216, a wearability model building module 218, a prediction data processing module 222, and a predictive metrics generating module 224). These modules may be software instructions executed by one or more processors associated with the wearability setup subsystem 203. In some implementations, the wearability setup subsystem 203 may correspond to the wearability setup subsystem 118 of FIG. 1.

The wearability setup subsystem 203 may receive various data attributes in order to build a training data set for neural network training, and to generate prediction data such as, e.g., [UUID, SKU] prediction pairs each combined with predictive wearability metrics. The data attributes received may be raw attributes 210, historical shipping and RNs 212, historical closet data 214, and active closet data 220, and the data attributes may be received from BI component 116 and/or product OLTP component 114.

The modeling data processing module 216 may prepare and process modeling data, which are needed for the machine learning process of models that produce predictive wearability metrics. First, in input data, such as raw attributes 210, historical shipping and RNs 212, and historical closet data 214, may be received from BI component 116 and/or product OLTP component 114. In some implementations, the raw attributes 210 may be gathered and placed into advanced analytics tables, as described in further detail with respect to FIG. 3 below. Based on the advanced analytics tables, raw attributes 210, historical shipping and RNs 212, and/or historical closet data 214, the modeling data processing module 216 may join feature vectors for shipped pairs with RNs. For example, shipped pairs of garments may form a vector such as (UUID, SKU, shipped date), and this vector may be joined with features having analytics (e.g., analytics from the advanced analytics tables, or any other user/SKU/apparel/closet level attributes retrieved from raw attributes 210, historical shipping and RNs 212, and/or historical closet data 214). As used herein, a feature may refer any analytics used in the model training environment 201, and an analytic may refer to any user/SKU/apparel/closet level attribute.

Then, these joined vectors may be downloaded into one or more data files (e.g., one or more csv files, or any other one or more types of data files capable of storing joined vectors), and the criteria for such downloading may be limited by conditions if there are preset conditions. For example, there may be a condition that only apparel shipped in the past x days (e.g., 90 days) may be loaded into the csv files. With the data set from the one or more csv files, the modeling data processing module 216 may then clean the data set, based on further conditions. For example, the modeling data processing module 216 may detect a preset condition that data associated with historical feedback from users may be used only if the data has an RN count (e.g., number of RNs received regarding that apparel or that user) over 5, or any other preset threshold value. In this example, any data with less than or equal to the preset threshold value may be voided from the data set as part of the cleaning process.

After cleaning the data, the modeling data processing module 216 may then transform the data set by running the data set into additional filters and conversions. For example, features having at least x % of missing data attributes (e.g., with x being a preset number such as 50) may be removed from the data set. In addition, categorical features may be dummified. For example, attributes pertaining to a category of apparel or users, rather than to an individual garment or user, may have arbitrary, inaccurate, or unfilled values when compared to attributes pertaining to individual (UUID, SKU) pairs, and such values may be replaced with dummy values. Additionally, missing features may be imputed by, for example, searching for the missing feature value from other places (e.g., BI component 116, product OLTP component 114, or any other database or internal storage accessible by wearability setup subsystem 203), and/or filling the missing features with default, preset value. Additionally, the features may also be normalized, by realigning or adjusting values based on a preset factor, removing outliers, and/or standardizing the values in any way in accordance with preset rules or conditions. In some implementations, the modeling data processing module 216 may save the resulting training data set as modeling ETL (Extract, Transform, Load) objects in one or more target databases in communication with wearability setup subsystem 203. The training data set may become available (e.g., by transmission or storing at designated files and locations) for the wearability model building module 218 to use in a neural network training process.

The wearability model building module 218 may perform the training process for producing models, using the training data set output from the modeling data processing module 216. As discussed above, the training process may be performed as an offline process, and as such, may run fewer, independent cycles (e.g., 1-3 times a day as opposed to hourly) compared to the matching operations of the matching environment 202. In each cycle of training, a neural network may be trained based on the training data set. As used herein, a neural network may be, for example, a deep learning neural network that has more layers than traditional neural network. The wearability model building module 218 may train a neural network such that trained models may be configured to output a metric for any pair of a unique user identifier and a unique apparel identifier (e.g., a predictive wearability metric indicative of propensity to wear, which may be a predicted wearability score based on a predictive modeling from the training or a default score). For example, the output metric may be an average rate that a given garment was reported as worn (e.g., binary flag of worn vs. not worn in user-provided RNs) by a given set of users (the user corresponding to the UUID, or a set of users associated with that user based on user attributes). After a cycle of training a neural network, one or more trained models resulting from the training may be stored as trained model objects in one or more databases in communication with wearability setup subsystem 203.

In some implementations, the wearability setup subsystem 203 may also evaluate the trained model objects, by executing or simulating the trained model objects generated at the wearability model building module 218, and assessing the objects. For example, the assessment may comprise predicting wearability metrics for training pairs, and calculating assessment metrics such as accuracy, AUC (Area Under the Curve), precision, recall, etc. The AUC may, for example, be used in a classification analysis in order to determine which of the model objects best predicts classes.

The prediction data processing module 222 may collect and prepare data in order for the predictive metrics generating module 224 to generate predictive wearability metrics. The prediction data processing module 222 may collect data as close to real-time as possible. For example, if a user just closeted a new garment and/or return notified (e.g., sent an RN for) a garment, the prediction data processing module 222 may capture data attributes associated with all of those activities immediately, because obtaining or missing one data attribute for a user may have an effect on the predictive wearability metrics produced by the predictive metrics generating module 224. The active closet data may be received from BI component 116. Active data related to RNs may be received from, for example, the modeling data processing module 216. Additionally, the prediction data processing module 222 may not only capture new closeting or RN data relationships (e.g., UUID-SKU relationship), but also collect data attributes related to the relationship (e.g., details regarding each SKU on attribute levels), from the BI component 116, the modeling data processing module 216, or any other databases in in communication with the environment 200.

Using the collected data, the prediction data processing module 222 may prepare the prediction data for subsequent steps (e.g., steps performed by the predictive metrics generating module 224). First, the prediction data processing module 222 may define the universe of the closeted pairs of unique user identifiers and unique apparel identifiers. Then it may join advanced features (e.g., advanced analytics tables described with respect to processing modeling data) for the closeted pairs. The closeted files may then be downloaded into one or more csv files. With the data set from the one or more csv files, the prediction data processing module 222 may then clean the data set, based on further conditions. For example, prediction data processing module 222 may detect a preset condition that data associated with historical feedback from users may be used only if the data has an RN count (e.g., number of RNs received regarding that apparel or that user) over 5, or any other preset threshold value. In this example, any data with less than or equal to the preset threshold value may be voided from the data set as part of the cleaning process.

After cleaning the data, the prediction data processing module 222 may then transform the data set by running the data set into additional filters and conversions. For example, model ETL objects (saved by the modeling data processing module 216) may be loaded. In addition, categorical features may be dummified. For example, attributes pertaining to a category of apparel or users, rather than to an individual garment or user, may have arbitrary, inaccurate, or unfilled values when compared to attributes pertaining to (UUID, SKU) pairs, and such values may be replaced with dummy values. Additionally, missing features may be imputed by, for example, searching for the missing feature value from other places (e.g., BI component 116, product OLTP component 114, or any other database or internal storage accessible by wearability setup subsystem 203), and/or filling the missing features with default, preset value. Additionally, the features may also be normalized, by realigning or adjusting values based on a preset factor, removing outliers, and/or standardizing the values in any way in accordance with preset rules or conditions. As a result of these transformations, the prediction data may be prepared and become available for the module for the predictive metrics generating module 224.

The predictive metrics generating module 224 may then run prediction on the prediction data, by predicting one or more predictive wearability metrics indicative of propensity to wear. Such a prediction may occur by loading the stored one or more trained model objects, executing the trained model objects with the prediction data, and generating predictive wearability metrics resulting from the execution of the training model objects. In some implementations, the predictive metrics generating module 224 may also predict metrics or scores for training pairs (e.g., for purposes of assessment or training associated with the prediction process). The predictive metrics generating module 224 may then store the resulting predictive wearability metrics in metrics database 120, as described above with respect to FIG. 1.

In the matching environment 202, match wearability metrics and cost-function outputs may be generated. Based on predictive wearability metrics output from the predictive metrics generating module 224, as well as real-time RIDs and real-time closet received from the product OLTP component 114 and/or the RID information repository 124, the matching environment 202 may dynamically generate result file 240 having match wearability metrics and cost-function outputs. This process may be performed by matching setup engine 236 and matching engine 238, which have been described in detail with respect to FIG. 1 above. For example, in some implementations, matching setup engine 236 may correspond to the matching setup engine 126 of FIG. 1, and the matching engine 238 may correspond to the matching engine 130 of FIG. 1.

The number and arrangement of devices, networks, and modules shown in FIG. 2 are provided as an example. In practice, there may be additional devices and/or modules, fewer devices and/or modules, different devices and/or modules, or differently arranged devices and/or modules than those shown in FIG. 2. Furthermore, two or more devices or modules shown in FIG. 2 may be implemented within a single device, or a single device shown in FIG. 2 may be implemented as multiple, distributed devices. Additionally, or alternatively, a device or a module of environment 200 may perform one or more functions described as being performed by another device or module of environment 200.

Figure 3:
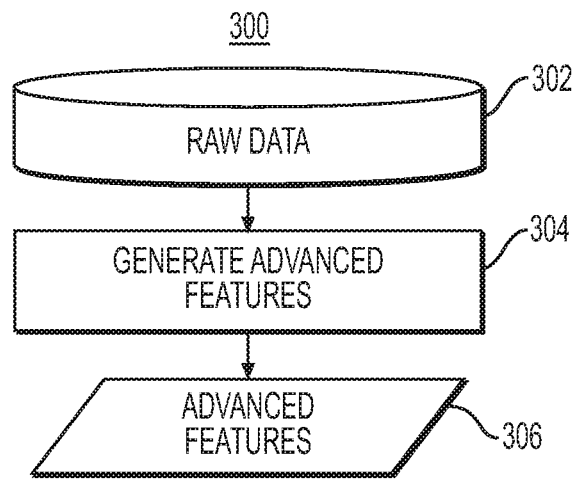
FIG. 3 depicts an exemplary method for transforming raw data attributes with advanced features at the wearability setup subsystem, according to one or more embodiments.

FIG. 3 depicts an exemplary method 300 for transforming data attributes with advanced features at the wearability setup subsystem 203. As described above with respect to FIG. 2, the modeling data processing module 216 may receive various input data, including raw attributes 210, historical shipping and RNs 212, and/or historical closet data 214 from data tables at BI component 116. The modeling data processing module 216 may collect, analyze, and/or organize (e.g., via SQL queries) the input data 302 (Step 304) according to preset criteria, to generate and/or append the advanced features 306. For example, the modeling data processing module 216 may generate one or more patterns and/or distributions as data among the advanced features 306, based on raw attributes 210, historical shipping and RNs 212, and/or historical closet data 214. The generated one of more patterns and/or distributions may be, for example, fit ratings of each garment (e.g., apparel corresponding to each unique apparel identifier), output as distributions in quartiles, and the distributions may include a plurality of distributions based on groups, such as users of different geographical locations, or apparel attributes (e.g., color, hemline length, etc.). The generated and/or appended advanced features may be stored, for example, at data tables at BI component 116 or any other database in communication with the environment 100, with write protection and access capability by wearability setup subsystem 203. In some implementations, the advanced features may be used as the training data set for the wearability model building module 218. An example of the advanced features is shown in Table 1.

TABLE 1

| Historical Cumulative Data | |
|---|---|
| Historical shipped pairs | (UUID, SKU, date - actual worn, fit rating, etc.) |
| User cumulative RNs, as of a given hist. date | (UUID, date - % worn, average fit rating, count, etc.) |
| SKU cumulative RNs, as of a given date | (SKU, date - average fit rating, count, etc.) |
| Style + Color cumulative RNs, as of a given date | (garment, date - average heart rating, count, etc.) |
| SKU cumulative product reviews, as of a given date | (SKU, date - avg product reviews, count, etc.) |
| User cumulative shipments, as of a given hist. Date | (UUID, date - # shipped boxes, # shipped SKUs, etc.) |
| User canonical size (c-size) | (user - last RN date, average c-size with good + fitting, min c-size, max c-size, etc.) |
| Pair last feedback dates | (UUID, SKU, shipped date - user last RN date, SKU last RN date, etc.) |
| Closet attributes | (UUID, SKU, shipped date - is prioritized, closet date, etc.) |
| SKU usage | (SKU, date - average # usage for available snowflakes, etc.) |
| Static Data | |
| User attributes | (user - tenant id, first shipped date, # at home, closet size, plan size, etc.) |
| SKU attributes | (SKU - c-size, brand, product type, retail price, gb purchase price, fabric, etc.) |
| Skyle + Color attributes | (garment - hemline length, neckline shape, etc.) |

Figure 4:
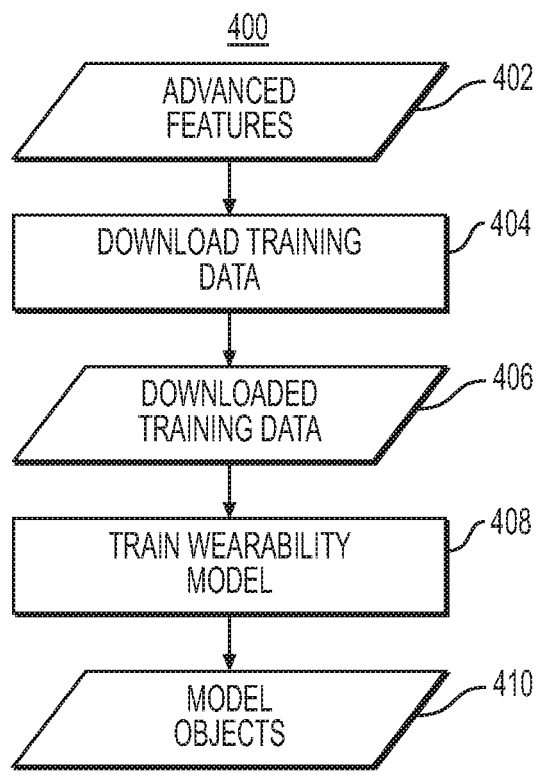
FIG. 4 depicts an exemplary method for building wearability model at the wearability setup subsystem, according to one or more embodiments.

FIG. 4 depicts an exemplary method 400 for building wearability model at the wearability setup subsystem 203. The wearability model building module 218 may receive advanced features 402 from the modeling data processing module 216. (Step 404). Additionally, or alternatively, the wearability model building module 218 may download training data set generated by the modeling data processing module 216, from BI component 116, a database in communication with the wearability setup subsystem 203, and/or the modeling data processing module 216 (Step 404). The wearability model building module 218 may then train a neural network based on the training data set to configure one or more trained models to output a metric for any pair of a unique user identifier and a unique apparel identifier (Step 408). The training may be implemented using, for example, Python, and the training may predict a model such that the model predicts a metric for every pair. For example, the training may be configured such that missing numeric features are filled with the group average, zero, or a preset value, and missing categorical features are treated as a new category. Lastly, the one or more trained models may be stored as one or more trained model objects 410. In some implementations, two types of model objects may be generated for each training model, one for data pre-processing and one for scoring metrics. The trained model objects may be stored, for example, at a database within wearability setup subsystem 203 and backed up at match database 134.

Figure 5A:
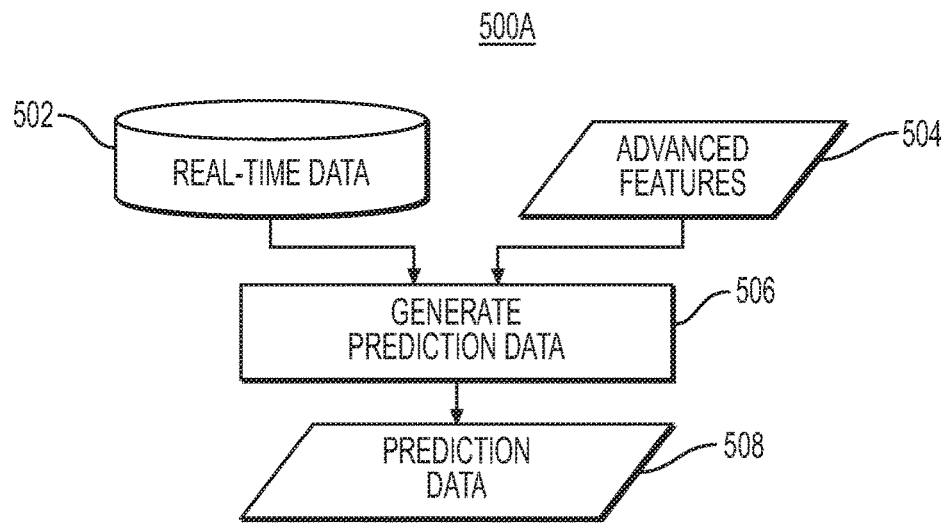
FIG. 5A depicts an exemplary method for processing prediction data at the wearability setup subsystem, according to one or more embodiments.

FIG. 5A depicts an exemplary method 500A for processing prediction data at the wearability setup subsystem 203. The prediction data processing module 222 may receive real-time data 502 and the advanced features 504. The advanced features may be received from the modeling data processing module 216. The real-time data 502 may be received, for example, from the BI component 116, the product OLTP component 114, and/or the match database 134. The real-time data 502 may include, for example, real-time RID, active closet data, transaction data, subscription user feedback data, user data such as unique user identifiers, and/or apparel data such as unique apparel identifiers. Then the prediction data processing module 222 may generate prediction data 508 by collecting and organizing the input data (e.g., real-time data 502 and advanced features 504) into a preset format (e.g., UUID-SKU format) which may be used by the predictive metrics generating module 224 (Step 506). In some implementations, the prediction data may saved as one or more csv files at a database in communication with the wearability setup subsystem 203.

Figure 5B:
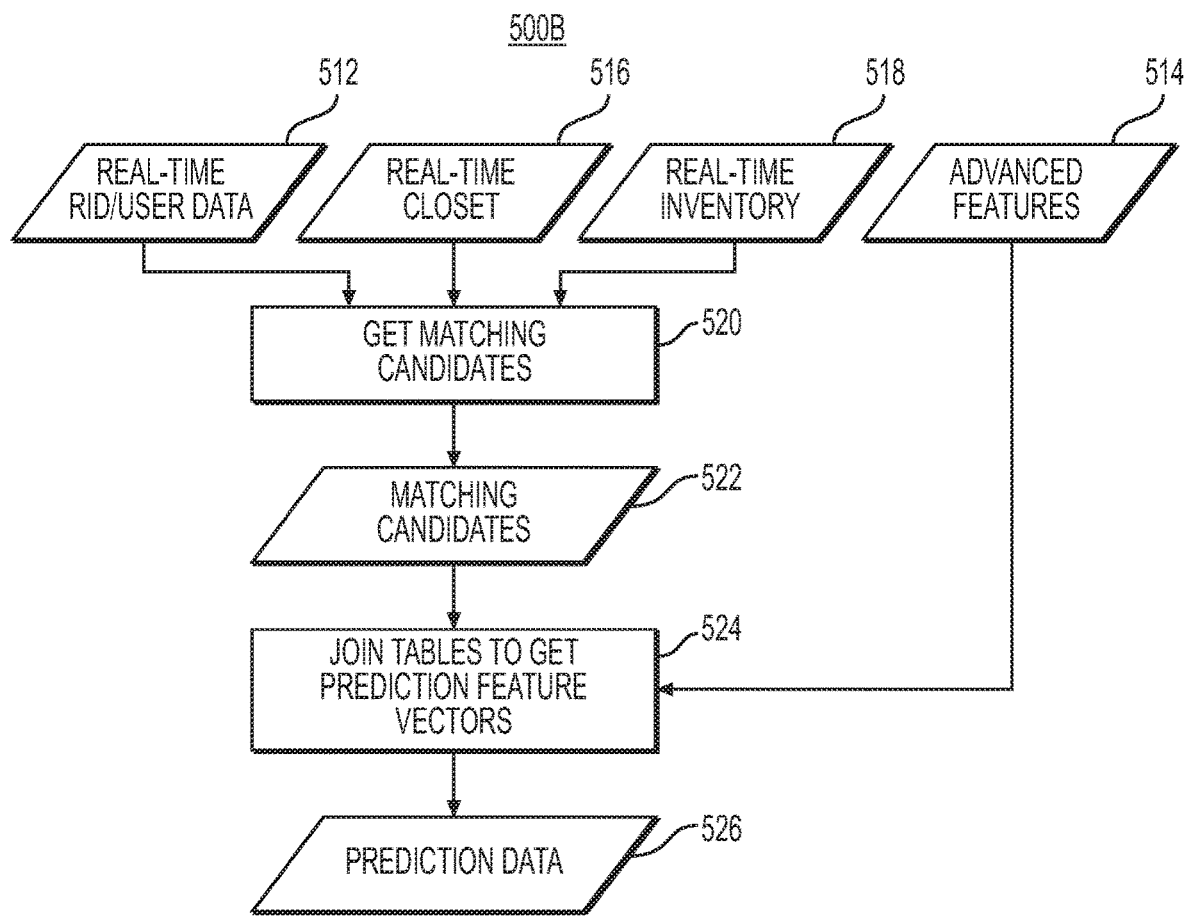
FIG. 5B depicts an exemplary method for processing prediction data at the wearability setup subsystem, according to one or more alternative embodiments.

FIG. 5B depicts an exemplary method 500B for processing prediction data at the wearability setup subsystem 203, according to one or more alternative embodiment. The prediction data processing module 222 may receive real-time data and the advanced features 514. The real-time data may include real-time RID/user data 512, real-time closet data 516, and real-time inventory data 518, which may be received, for example, from the BI component 116, the product OLTP component 114, and/or the match database 134. The advanced features may be received from the modeling data processing module 216. Then, the prediction data processing module 222 generate matching candidates 522 (Step 520), by for example, applying a preset filter to the real-time data. The prediction data processing module 222 may then join data tables from matching candidates 522, and data from advanced features 514 (Step 524). For example, generating of matching candidates may be implemented using Python, and Steps 520 and 524 may run in periodic cycles (e.g., three times a day). The data set resulting from joining of the data tables may be saved as the prediction data 526. In some implementations, the prediction data may saved as one or more csv files at a database in communication with the wearability setup subsystem 203. For example, the prediction data 526 may be in preset format (e.g., UUID-SKU format) which may be used by the predictive metrics generating module 224.

Figure 6:
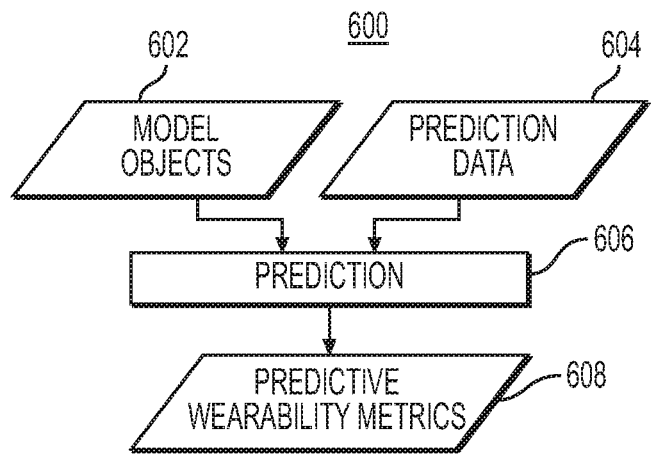
FIG. 6 depicts an exemplary method for generating predictive wearability metrics using trained model objects, according to one or more embodiments.

FIG. 6 depicts an exemplary method 600 for generating predictive wearability metrics using trained model objects, according to one or more embodiments. The predictive metrics generating module 224 may receive trained model objects 602 generated at the wearability model building module 218, and prediction data 604 generated at the prediction data processing module 222. The prediction data 604 may comprise data attributes (e.g., UUID-SKU pairs) linked with other attribute level analytics, as described in detail above with respect to FIGS. 1 and 2. The predictive metrics generating module 224 may then predict one or more predictive wearability metrics 608 indicative of propensity to wear, by executing the received one or more trained model objects 602 with the prediction data 604 (Step 606).

Figure 7:
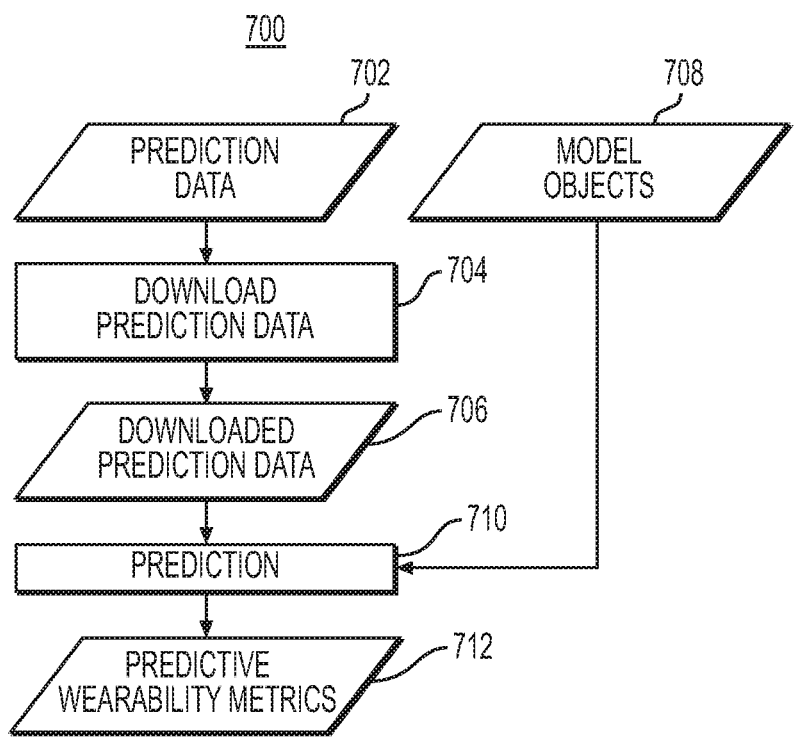
FIG. 7 depicts an exemplary method for generating predictive wearability metrics using trained model objects, according to one or more alternative embodiments.

FIG. 7 depicts an exemplary method 700 for generating predictive wearability metrics using trained model objects, according to one or more alternative embodiments. The predictive metrics generating module 224 may acquire an existing set of prediction data 702, which were generated at the prediction data processing module 222. The prediction data 604 may comprise data attributes (e.g., UUID-SKU pairs) linked with other attribute level analytics, as described in detail above with respect to FIGS. 1 and 2. Subsequently, the predictive metrics generating module 224 download a new set of prediction data 706, based on, for example, an automatic or manual prompt to download another set of prediction data (Step 704). The new set of prediction data 706 may then augment, replace, or be otherwise combined with the existing set of prediction data 702, to form the prediction data. The predictive metrics generating module 224 may then predict one or more predictive wearability metrics 712 indicative of propensity to wear, by receiving trained model objects 708 (e.g., from the wearability model building module 218) and executing the received one or more trained model objects 708 with the prediction data, and generate the predictive wearability metrics 712 (Step 710).

Figure 8:
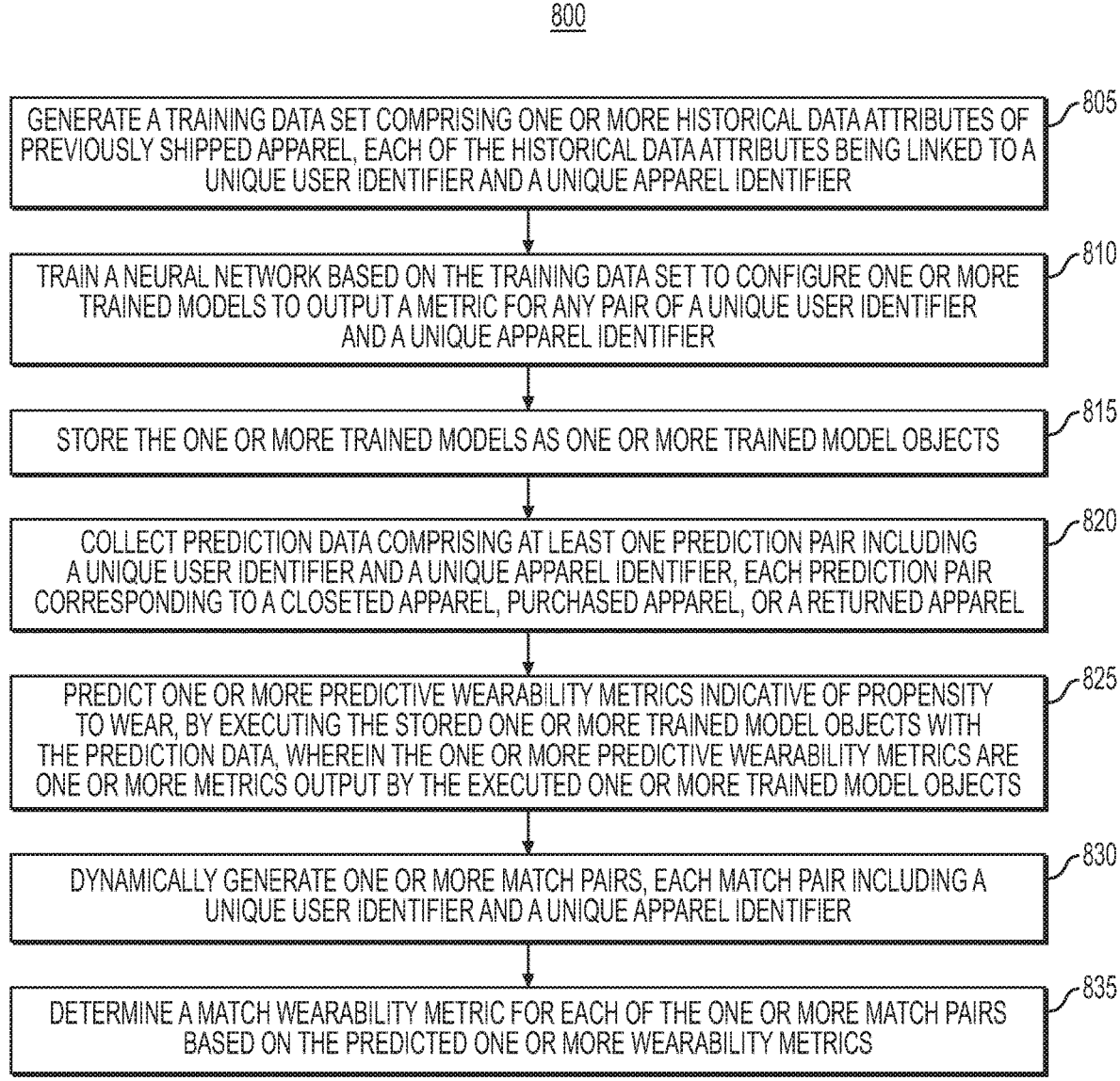
FIG. 8 depicts a flowchart of an exemplary method for executing neural network training for dynamically predicting apparel wearability, according to one or more embodiments.

FIG. 8 depicts a flowchart of an exemplary method for executing neural network training for dynamically predicting apparel wearability, according to one or more embodiments. In the exemplary method 800, one or more computer processors may generate a training data set comprising one or more historical data attributes of previously shipped apparel, each of the historical data attributes being linked to a unique user identifier and a unique apparel identifier (Step 805). The one or more processors may train a neural network based on the training data set to configure one or more trained models to output a metric for any pair of a unique user identifier and a unique apparel identifier. (Step 810). The one or more processors may store the one or more trained models as one or more trained model objects. (Step 815). The one or more processors may collect prediction data comprising at least one prediction pair including a unique user identifier and a unique apparel identifier, each prediction pair corresponding to a closeted garment or a returned garment (Step 820). The one or more processors may predict one or more predictive wearability metrics indicative of propensity to wear, by executing the stored one or more trained model objects with the prediction data, wherein the one or more predictive wearability metrics are one or more metrics output by the executed one or more trained model objects (Step 825). The one or more processors may dynamically generate one or more match pairs, each match pair including a unique user identifier and a unique apparel identifier (Step 830). The one or more processors may determine a match wearability metric for each of the one or more match pairs based on the predicted one or more wearability metrics. (Step 835).

Although FIGS. 3-8 show example blocks of processes 300-800, in some implementations, processes 300-800 may include additional blocks, fewer blocks, different blocks, or differently arranged blocks than those depicted in FIGS. 3-8. Additionally, or alternatively, two or more of the blocks of processes 300-800 may be performed in parallel.

Figure 9:
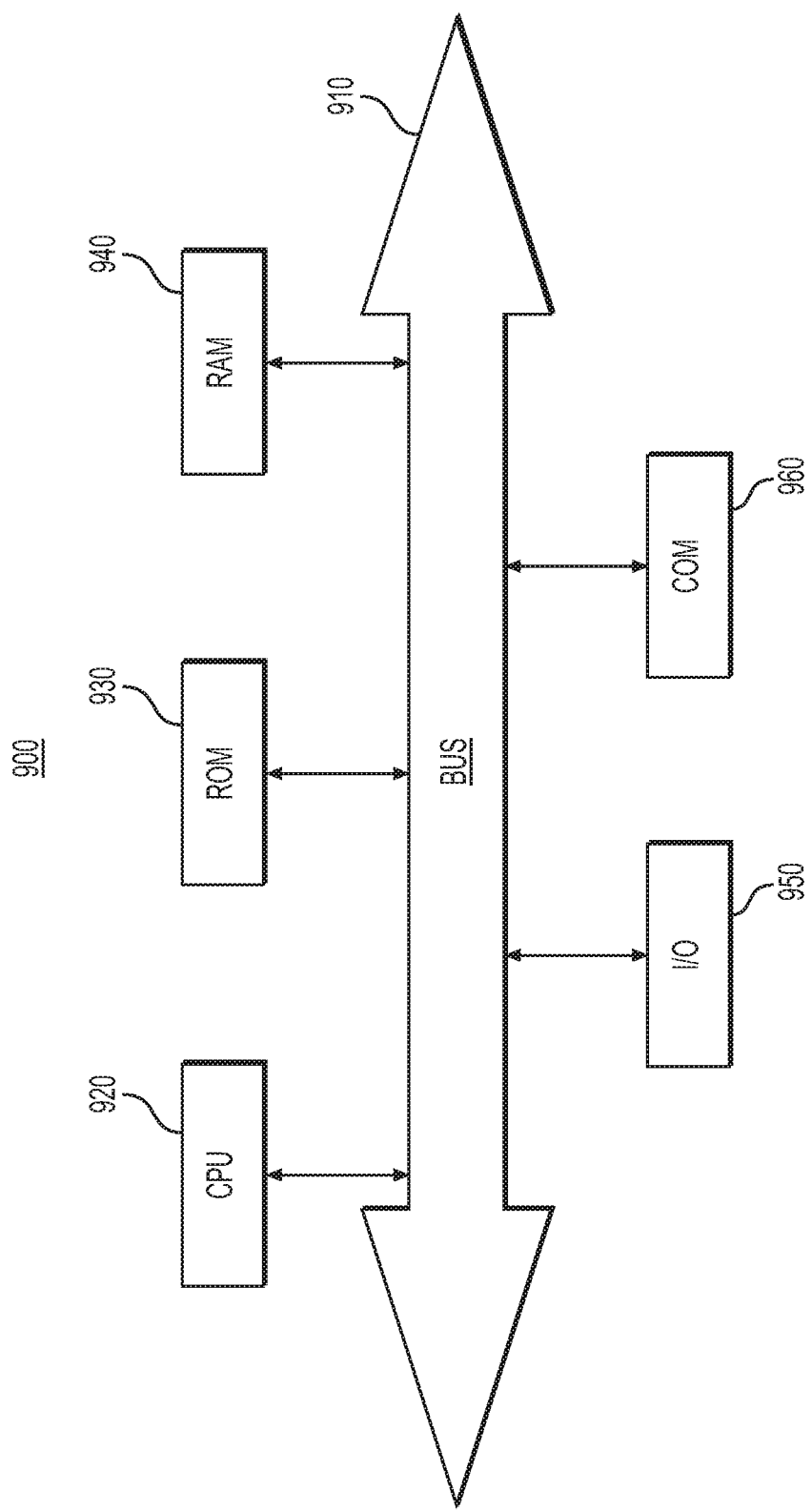
FIG. 9 depicts an exemplary computer device or system, in which embodiments of the present disclosure, or portions thereof, may be implemented.

FIG. 9 depicts a high-level functional block diagram of an exemplary computer device or system, in which embodiments of the present disclosure, or portions thereof, may be implemented, e.g., as computer-readable code. In some implementations, any combination of components depicted in the environment 100 of FIG. 1 or in the environment 200 of FIG. 2 may correspond to device 900. Additionally, each of the exemplary computer servers, devices, databases, user interfaces, and methods described above with respect to FIGS. 1-8 can be implemented in device 900 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-8.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor or a plurality of processors, or combinations thereof. Processor devices may have one or more processor "cores."

Various embodiments of the present disclosure, as described above in the examples of FIGS. 1-8, may be implemented using device 900. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 9, device 900 may include a central processing unit (CPU) 920. CPU 920 may be any type of processor device including, for example, any type of special purpose or a general-purpose microprocessor device. As will be appreciated by persons skilled in the relevant art, CPU 920 also may be a single processor in a multi-core/multi-processor system, such system operating alone, or in a cluster of computing devices operating in a cluster or server farm. CPU 920 may be connected to a data communication infrastructure 910, for example, a bus, message queue, network, or multi-core message-passing scheme.

Device 900 also may include a main memory 940, for example, random access memory (RAM), and also may include a secondary memory 930. Secondary memory 930, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 930 may include other similar means for allowing computer programs or other instructions to be loaded into device 900. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 900.

Device 900 also may include a communications interface ("COM") 960. Communications interface 960 allows software and data to be transferred between device 900 and external devices. Communications interface 960 may include a modem, a network interface (such as an Ethernet card), a communications port, a PCMCIA slot and card, or the like. Software and data transferred via communications interface 960 may be in the form of signals, which may be electronic, electromagnetic, optical, or other signals capable of being received by communications interface 960. These signals may be provided to communications interface 960 via a communications path of device 900, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 900 also may include input and output ports 950 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for executing neural network training for dynamically predicting apparel wearability in a subscription electronics transactions platform, the method comprising:
   generating, by one or more processors, a training data set comprising one or more historical data attributes of previously shipped apparel, each of the historical data attributes being linked to a pair of a unique user identifier and a unique apparel identifier used in the subscription electronic transactions platform to form feature vectors for each pair of a unique user identifier and a unique apparel identifier;
   training, by the one or more processors, a neural network based on the training data set to configure one or more trained models to output a metric for any pair of a unique user identifier and a unique apparel identifier used in the subscription electronic transactions platform;
   storing, by the one or more processors, the one or more trained models as one or more trained model objects at a database of the subscription electronic transactions platform;
   collecting, by the one or more processors, prediction data comprising at least one prediction pair including a unique user identifier and a unique apparel identifier used in the subscription electronic transactions platform, each prediction pair corresponding to apparel closeted, purchased, or returned through the subscription electronic transactions platform;
   executing, by the one or more processors, the stored one or more trained model objects with the prediction data to determine one or more predictive wearability metrics indicative of a propensity of a user to wear closeted, purchased, or returned apparel;
   periodically storing the one or more predictive wearability metrics at a metrics database of subscription electronic transactions platform under a first schedule, wherein storing the one or more predictive wearability metrics includes storing a first predictive wearability metric associated with a first prediction pair, the first prediction pair including a first unique user identifier and a first unique apparel identifier, the first predictive wearability metric indicating a propensity of a user associated with the first unique user identifier to wear apparel associated with the first unique apparel identifier;
   dynamically generating, by the one or more processors, one or more match pairs, each match pair including a unique user identifier and a unique apparel identifier used in the subscription electronic transactions platform; and
   periodically determining, by the one or more processors, a match wearability metric for each of the one or more match pairs based on the stored one or more predictive wearability metrics under a second schedule different from the first schedule, wherein determining the match wearability metric for each of the one or more match pairs includes: determining a first match pair including the first unique user identifier and the first unique apparel identifier, retrieving the stored first predictive wearability metric associated with the first unique user identifier and the first unique apparel identifier, and storing the retrieved first predictive wearability metric as a first match wearability metric for the first match pair, the first match wearability metric indicating the propensity of the user associated with the first unique user identifier to wear apparel associated with the first unique apparel identifier.

2. The method of claim 1, wherein the generating the training data set further comprises determining one or more distributions of fit ratings corresponding to a unique apparel identifier.

3. The method of claim 1, wherein the metrics database is a database configured to index, retrieve, and search a plurality of data files comprising the one or more predictive wearability metrics.

4. The method of claim 1, wherein the determining the match wearability metric for each of the one or more match pairs further comprises retrieving a predictive wearability metric among the one or more predictive wearability metrics stored at the metrics database.

5. The method of claim 1, wherein the dynamically generating the one or more match pairs is performed in response to receiving one or more replenishment identifiers.

6. A computer system for executing neural network training for dynamically predicting apparel wearability in a subscription electronics transactions platform, the computer system comprising:
   a memory having processor-readable instructions stored therein; and
   at least one processor configured to access the memory and execute the processor-readable instructions, which when executed by the at least one processor configures the at least one processor to perform a plurality of functions, including functions for:

generating a training data set comprising one or more historical data attributes of previously shipped apparel, each of the historical data attributes being linked to a pair of a unique user identifier and a unique apparel identifier used in the subscription electronics transactions platform to form feature vectors for each pair of a unique user identifier and a unique apparel identifier;

training a neural network based on the training data set to configure one or more trained models to output a metric for any pair of a unique user identifier and a unique apparel identifier used in the subscription electronics transactions platform;

storing the one or more trained models as one or more trained model objects at a database of the subscription electronics transactions platform;

collecting prediction data comprising at least one prediction pair including a unique user identifier and a unique apparel identifier used in the subscription electronic transactions platform, each prediction pair corresponding to apparel closeted, purchased, or returned through the subscription electronic transactions platform;

executing the stored one or more trained model objects with the prediction data to determine one or more predictive wearability metrics indicative of a propensity of a user to wear closeted, purchased, or returned apparel;

periodically storing the one or more predictive wearability metrics at a metrics database of subscription electronic transactions platform under a first schedule, wherein storing the one or more predictive wearability metrics includes storing a first predictive wearability metric associated with a first prediction pair, the first prediction pair including a first unique user identifier and a first unique apparel identifier, the first predictive wearability metric indicating a propensity of a user associated with the first unique user identifier to wear apparel associated with the first unique apparel identifier;

dynamically generating one or more match pairs, each match pair including a unique user identifier and a unique apparel identifier used in the subscription electronic transactions platform; and periodically determining a match wearability metric for each of the one or more match pairs based on the stored one or more wearability metrics under a second schedule different from the first schedule, wherein determining the match wearability metric for each of the one or more match pairs includes:

determining a first match pair including the first unique user identifier and the first unique apparel identifier, retrieving the stored first predictive wearability metric associated with the first unique user identifier and the first unique apparel identifier, and storing the retrieved first predictive wearability metric as a first match wearability metric for the first match pair, the first match wearability metric indicating the propensity of the user associated with the first unique user identifier to wear apparel associated with the first unique apparel identifier.

7. The system of claim 6, wherein the generating the training data set further comprises determining one or more distributions of fit ratings corresponding to a unique apparel identifier.

8. The system of claim 6, wherein the metrics database is a database configured to index, retrieve, and search a plurality of data files comprising the one or more predictive wearability metrics.

9. The system of claim 6, wherein the determining the match wearability metric for each of the one or more match pairs further comprises retrieving a predictive wearability metric among the one or more predictive wearability metrics stored at the metrics database.

10. The system of claim 6, wherein the dynamically generating the one or more match pairs is performed in response to receiving one or more replenishment identifiers.

11. A non-transitory computer-readable medium containing instructions for executing neural network training for dynamically predicting apparel wearability in a subscription electronics transactions platform, comprising:

generating a training data set comprising one or more historical data attributes of previously shipped apparel, each of the historical data attributes being linked to a pair of a unique user identifier and a unique apparel identifier used in the subscription electronic transactions platform to form feature vectors for each pair of a unique user identifier and a unique apparel identifier;

training a neural network based on the training data set to configure one or more trained models to output a metric for any pair of a unique user identifier and a unique apparel identifier used in the subscription electronic transactions platform;

storing the one or more trained models as one or more trained model objects at a database of the subscription electronic transactions platform;

collecting prediction data comprising at least one prediction pair including a unique user identifier and a unique apparel identifier used in the subscription electronic transactions platform, each prediction pair corresponding to apparel closeted, purchased, or returned through the subscription electronic transactions platform;

executing, by the one or more processors, the stored one or more trained model objects with the prediction data to determine one or more predictive wearability metrics indicative of a propensity of a user to wear closeted, purchased, or returned apparel;

periodically storing the one or more predictive wearability metrics at a metrics database of subscription electronic transactions platform under a first schedule, wherein storing the one or more predictive wearability metrics includes storing a first predictive wearability metric associated with a first prediction pair, the first prediction pair including a first unique user identifier and a first unique apparel identifier, the first predictive wearability metric indicating a propensity of a user associated with the first unique user identifier to wear apparel associated with the first unique apparel identifier;

dynamically generating one or more match pairs, each match pair including a unique user identifier and a unique apparel identifier used in the subscription electronic transactions platform; and periodically determining a match wearability metric for each of the one or more match pairs based on the stored one or more wearability metrics under a second schedule different from the first schedule, wherein determining the match wearability metric for each of the one or more match pairs includes: determining a first match pair including the first unique user identifier and the first unique apparel identifier, retrieving the stored first predictive wearability metric associated with the first unique user identifier and the first unique apparel identifier, and storing the retrieved first predictive wearability metric as a first match wearability metric for the first match pair, the first match wearability metric indicating the propensity of the user associated with the first unique user identifier to wear apparel associated with the first unique apparel identifier.

12. The non-transitory computer-readable medium of claim 11, wherein the generating the training data set further comprises determining one or more distributions of fit ratings corresponding to a unique apparel identifier.

13. The non-transitory computer-readable medium of claim 11, wherein determining the match wearability metric for each of the one or more match pairs based on the predicted one or more predictive wearability metrics comprises:
retrieving the stored one or more predictive wearability metrics from the metrics database.

14. The non-transitory computer-readable medium of claim 11, wherein the metrics database is a database configured to index, retrieve, and search a plurality of data files comprising the one or more predictive wearability metrics.

15. The non-transitory computer-readable medium of claim 11, wherein the dynamically generating the one or more match pairs is performed in response to receiving one or more replenishment identifiers.

* * * * *